United States Patent
Heinze et al.

(10) Patent No.: US 8,254,551 B2
(45) Date of Patent: Aug. 28, 2012

(54) METHODS, SYSTEMS, AND COMPUTER PROGRAM PRODUCTS FOR PROVIDING QUALITY OF SERVICE USING E.164 NUMBER MAPPING (ENUM) DATA IN A COMMUNICATIONS NETWORK

(75) Inventors: Christopher R. Heinze, Raleigh, NC (US); Rohini Marathe, Cary, NC (US); Maria A. Wiatrowski, Raleigh, NC (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1334 days.

(21) Appl. No.: 11/635,406

(22) Filed: Dec. 7, 2006

(65) Prior Publication Data

US 2008/0137832 A1    Jun. 12, 2008

(51) Int. Cl.
*H04M 7/00* (2006.01)
(52) U.S. Cl. .......... 379/220.01; 379/221.09; 379/221.1; 379/221.12; 379/221.14; 379/142.06; 370/238; 370/395.2; 370/401; 370/389; 370/412
(58) Field of Classification Search .......... 379/201.01, 379/220.01; 370/352, 338; 707/100, 102
See application file for complete search history.

(56) References Cited

U.S. PATENT DOCUMENTS

| | | | |
|---|---|---|---|
| 4,310,727 A | 1/1982 | Lawser | |
| 4,754,479 A | 6/1988 | Bicknell et al. | |
| 4,819,156 A | 4/1989 | DeLorme et al. | |
| 5,089,954 A | 2/1992 | Rago | |
| 5,237,604 A | 8/1993 | Ryan | |
| 5,247,571 A | 9/1993 | Kay et al. | |
| 5,251,248 A | 10/1993 | Tokunaga et al. | |
| 5,400,390 A | 3/1995 | Salin | |
| 5,422,941 A | 6/1995 | Hasenauer et al. | |
| 5,423,068 A | 6/1995 | Hecker | |
| 5,430,719 A | 7/1995 | Weisser, Jr. | |
| 5,442,683 A | 8/1995 | Hoogeveen | |
| 5,455,855 A | 10/1995 | Hokari | |
| 5,457,736 A | 10/1995 | Cain et al. | |
| 5,481,603 A | 1/1996 | Gutierrez et al. | |
| 5,502,726 A | 3/1996 | Fischer | |

(Continued)

FOREIGN PATENT DOCUMENTS

EP    0 512 962 A2    11/1992

(Continued)

OTHER PUBLICATIONS

Notification of Transmittal of the International Search Report and the Written Opinion of the International Searching Authority, or the Declaration for International Application No. PCT/US07/24418 (May 1, 2008).

(Continued)

*Primary Examiner* — Joseph J Nguyen
(74) *Attorney, Agent, or Firm* — Jenkins, Wilson, Taylor & Hunt, P.A.

(57) ABSTRACT

Methods, systems, and computer program products for providing a quality of service (QoS) using E.164 number mapping (ENUM) data in a communications network. According to one method, a query message including an E.164 number can be received. Next, at least one uniform resource identifier (URI) associated with the E.164 number can be located. Afterwards, QoS data corresponding to the at least one URI is subsequently obtained. Further, the query message can be responded to with the URI and the corresponding QoS data.

39 Claims, 9 Drawing Sheets

U.S. PATENT DOCUMENTS

| | | | |
|---|---|---|---|
| 5,504,804 A | 4/1996 | Widmark et al. |
| 5,526,400 A | 6/1996 | Nguyen |
| 5,579,372 A | 11/1996 | Åström |
| 5,590,398 A | 12/1996 | Matthews |
| 5,594,942 A | 1/1997 | Antic et al. |
| 5,623,532 A | 4/1997 | Houde et al. |
| 5,689,548 A | 11/1997 | Maupin et al. |
| 5,706,286 A | 1/1998 | Reiman et al. |
| 5,711,002 A | 1/1998 | Foti |
| 5,819,178 A | 10/1998 | Cropper |
| 5,822,694 A | 10/1998 | Coombes et al. |
| 5,832,382 A | 11/1998 | Alperovich |
| 5,854,982 A | 12/1998 | Chambers et al. |
| 5,878,347 A | 3/1999 | Joensuu et al. |
| 5,878,348 A | 3/1999 | Foti |
| 5,890,063 A | 3/1999 | Mills |
| 5,953,662 A | 9/1999 | Lindquist et al. |
| 5,953,663 A | 9/1999 | Maupin et al. |
| 5,983,217 A | 11/1999 | Khosravi-Sichani et al. |
| 6,006,098 A | 12/1999 | Rathnasabapathy et al. |
| 6,011,803 A | 1/2000 | Bicknell et al. |
| 6,014,557 A | 1/2000 | Morton et al. |
| 6,018,657 A | 1/2000 | Kennedy, III et al. |
| 6,038,456 A | 3/2000 | Colby et al. |
| 6,049,714 A | 4/2000 | Patel |
| 6,097,960 A | 8/2000 | Rathnasabapathy et al. |
| 6,115,463 A | 9/2000 | Coulombe et al. |
| H1895 H | 10/2000 | Hoffpauir et al. |
| 6,128,377 A | 10/2000 | Sonnenberg |
| 6,137,806 A | 10/2000 | Martinez |
| 6,138,016 A | 10/2000 | Kulkarni et al. |
| 6,138,017 A | 10/2000 | Price et al. |
| 6,138,023 A | 10/2000 | Agarwal et al. |
| 6,144,857 A | 11/2000 | Price et al. |
| 6,148,204 A | 11/2000 | Urs et al. |
| 6,192,242 B1 | 2/2001 | Rollender |
| 6,205,210 B1 | 3/2001 | Rainey et al. |
| 6,226,517 B1 | 5/2001 | Britt et al. |
| 6,236,365 B1 | 5/2001 | LeBlanc et al. |
| 6,263,212 B1 | 7/2001 | Ross et al. |
| 6,308,075 B1 | 10/2001 | Irten et al. |
| 6,327,350 B1 | 12/2001 | Spangler et al. |
| 6,411,632 B2 | 6/2002 | Lindgren et al. |
| 6,424,832 B1 | 7/2002 | Britt et al. |
| 6,434,144 B1 | 8/2002 | Romanov |
| 6,463,055 B1 | 10/2002 | Lupien et al. |
| 6,505,046 B1 | 1/2003 | Baker |
| 6,515,997 B1 | 2/2003 | Feltner et al. |
| 6,535,746 B1 | 3/2003 | Yu et al. |
| 6,539,077 B1 | 3/2003 | Ranalli et al. |
| 6,560,216 B1 | 5/2003 | McNiff et al. |
| 6,560,456 B1 | 5/2003 | Lohtia et al. |
| 6,574,481 B1 | 6/2003 | Rathnasabapathy et al. |
| 6,594,258 B1 | 7/2003 | Larson et al. |
| 6,611,516 B1 | 8/2003 | Pirkola et al. |
| 6,643,511 B1 | 11/2003 | Rune et al. |
| 6,662,017 B2 | 12/2003 | McCann et al. |
| 6,683,881 B1 | 1/2004 | Mijares et al. |
| 6,684,073 B1 | 1/2004 | Joss et al. |
| 6,731,926 B1 | 5/2004 | Link, II et al. |
| 6,738,636 B2 | 5/2004 | Lielbriedis |
| 6,748,057 B2 | 6/2004 | Ranalli et al. |
| 6,775,737 B2 | 8/2004 | Warkhede et al. |
| 6,795,701 B1 | 9/2004 | Baker et al. |
| 6,839,421 B2 | 1/2005 | Ferraro Esparza et al. |
| 6,871,070 B2 | 3/2005 | Ejzak |
| 6,917,612 B2 | 7/2005 | Foti et al. |
| 6,950,441 B1 | 9/2005 | Kaczmarczyk et al. |
| 7,010,002 B2 | 3/2006 | Chow et al. |
| 7,027,582 B2 | 4/2006 | Khello et al. |
| 7,035,239 B2 | 4/2006 | McCann et al. |
| 7,039,037 B2 | 5/2006 | Wang et al. |
| 7,054,652 B2 | 5/2006 | Luis |
| 7,079,524 B2 | 7/2006 | Bantukul et al. |
| 7,079,853 B2 | 7/2006 | Rathnasabapathy et al. |
| 7,085,260 B2 | 8/2006 | Karaul et al. |
| 7,170,982 B2 | 1/2007 | Li et al. |
| 7,221,952 B2 | 5/2007 | Cho et al. |
| 7,274,683 B2 | 9/2007 | Segal |
| 7,286,839 B2 | 10/2007 | McCann et al. |
| 7,397,773 B2 | 7/2008 | Qu et al. |
| 7,457,283 B2 | 11/2008 | Dalton, Jr. et al. |
| 7,551,608 B1 | 6/2009 | Roy |
| 7,627,108 B1 | 12/2009 | Enzmann et al. |
| 7,693,135 B2 | 4/2010 | Pershan |
| 7,715,367 B2 * | 5/2010 | Nishida et al. ............ 370/352 |
| 7,746,864 B1 | 6/2010 | Asawa et al. |
| 7,751,386 B2 * | 7/2010 | Kobayashi et al. ......... 370/352 |
| 7,787,445 B2 | 8/2010 | Marsico |
| 7,889,716 B2 | 2/2011 | Tejani et al. |
| 7,996,541 B2 | 8/2011 | Marathe et al. |
| 2001/0008532 A1 | 7/2001 | Lee |
| 2001/0029182 A1 | 10/2001 | McCann et al. |
| 2001/0030957 A1 | 10/2001 | McCann et al. |
| 2001/0040957 A1 | 11/2001 | McCann et al. |
| 2001/0055380 A1 | 12/2001 | Benedyk et al. |
| 2002/0054674 A1 | 5/2002 | Chang et al. |
| 2002/0095421 A1 | 7/2002 | Koskas |
| 2002/0114440 A1 | 8/2002 | Madour et al. |
| 2002/0147845 A1 | 10/2002 | Sanchez-Herrero et al. |
| 2002/0173320 A1 | 11/2002 | Aitken et al. |
| 2002/0176382 A1 | 11/2002 | Madour et al. |
| 2002/0176562 A1 | 11/2002 | Hao |
| 2003/0007482 A1 | 1/2003 | Khello et al. |
| 2003/0026289 A1 | 2/2003 | Mukherjee et al. |
| 2003/0054844 A1 | 3/2003 | Anvekar et al. |
| 2003/0065788 A1 | 4/2003 | Salomaki |
| 2003/0081754 A1 | 5/2003 | Esparza et al. |
| 2003/0109271 A1 | 6/2003 | Lewis et al. |
| 2003/0128693 A1 | 7/2003 | Segal |
| 2003/0193967 A1 | 10/2003 | Fenton et al. |
| 2003/0220951 A1 | 11/2003 | Muthulingam et al. |
| 2003/0227899 A1 | 12/2003 | McCann |
| 2004/0003114 A1 | 1/2004 | Adamczyk |
| 2004/0034699 A1 | 2/2004 | Gotz et al. |
| 2004/0076126 A1 | 4/2004 | Qu et al. |
| 2004/0081206 A1 | 4/2004 | Allison et al. |
| 2004/0082332 A1 | 4/2004 | McCann et al. |
| 2004/0087300 A1 | 5/2004 | Lewis |
| 2004/0141488 A1 * | 7/2004 | Kim et al. ............ 370/338 |
| 2004/0142707 A1 | 7/2004 | Midkiff et al. |
| 2004/0198351 A1 | 10/2004 | Knotts |
| 2004/0202187 A1 | 10/2004 | Kelly et al. |
| 2004/0243596 A1 * | 12/2004 | Lillqvist et al. ............ 707/100 |
| 2004/0246965 A1 | 12/2004 | Westman et al. |
| 2005/0101297 A1 | 5/2005 | Delaney et al. |
| 2005/0119017 A1 | 6/2005 | Lovell, Jr. et al. |
| 2005/0182781 A1 * | 8/2005 | Bouvet ............ 707/102 |
| 2005/0251509 A1 | 11/2005 | Pontius |
| 2005/0286531 A1 | 12/2005 | Tuohino et al. |
| 2006/0002308 A1 | 1/2006 | Na et al. |
| 2006/0034256 A1 | 2/2006 | Addagatla et al. |
| 2006/0067338 A1 | 3/2006 | Hua et al. |
| 2006/0098621 A1 | 5/2006 | Plata et al. |
| 2006/0136557 A1 | 6/2006 | Schaedler et al. |
| 2006/0165068 A1 * | 7/2006 | Dalton et al. ............ 370/352 |
| 2006/0245573 A1 | 11/2006 | Sheth et al. |
| 2006/0293021 A1 | 12/2006 | Zhou |
| 2007/0019625 A1 | 1/2007 | Ramachandran et al. |
| 2007/0061397 A1 | 3/2007 | Gregorat et al. |
| 2007/0104184 A1 | 5/2007 | Ku et al. |
| 2007/0115934 A1 | 5/2007 | Dauster et al. |
| 2007/0116250 A1 | 5/2007 | Stafford |
| 2007/0121879 A1 | 5/2007 | McGary et al. |
| 2007/0133574 A1 | 6/2007 | Tejani et al. |
| 2007/0243876 A1 | 10/2007 | Duan |
| 2007/0286379 A1 | 12/2007 | Wiatrowski et al. |
| 2008/0019356 A1 | 1/2008 | Marsico |
| 2008/0109532 A1 * | 5/2008 | Denoual et al. ............ 709/219 |
| 2008/0112399 A1 * | 5/2008 | Cohen et al. ............ 370/356 |
| 2008/0130856 A1 * | 6/2008 | Ku et al. ............ 379/201.01 |
| 2008/0247526 A1 | 10/2008 | Qiu et al. |
| 2008/0281975 A1 | 11/2008 | Qiu et al. |
| 2008/0311917 A1 | 12/2008 | Marathe et al. |
| 2009/0103707 A1 | 4/2009 | McGary et al. |
| 2009/0227276 A1 | 9/2009 | Agarwal et al. |
| 2010/0285800 A1 | 11/2010 | McCann |

FOREIGN PATENT DOCUMENTS

| | | |
|---|---|---|
| EP | 0 936 825 A3 | 8/1999 |
| EP | 0 944 276 A1 | 9/1999 |
| EP | 1 285 545 B1 | 10/2004 |
| EP | 1 558 004 A | 7/2005 |
| KR | 2000-0037801 | 7/2000 |
| KR | 2003-0040291 A1 | 5/2003 |
| WO | WO 95/12292 A1 | 5/1995 |
| WO | WO 96/11557 | 4/1996 |
| WO | WO 97/33441 A1 | 9/1997 |
| WO | WO 98/18269 | 4/1998 |
| WO | WO 99/11087 A2 | 3/1999 |
| WO | WO 99/57926 | 11/1999 |
| WO | WO 00/16583 A1 | 3/2000 |
| WO | WO 01/47297 A2 | 6/2001 |
| WO | WO 01/48981 A1 | 7/2001 |
| WO | WO 01/54444 A1 | 7/2001 |
| WO | WO 03/005664 A2 | 1/2003 |
| WO | WO 03/105382 A1 | 12/2003 |
| WO | WO 2004/006534 | 1/2004 |
| WO | WO 2004/008786 A1 | 1/2004 |
| WO | WO 2004/075507 | 9/2004 |
| WO | WO 2005/013538 A3 | 2/2005 |
| WO | WO 2007/045991 A1 | 4/2007 |
| WO | WO 2007/064943 A2 | 6/2007 |
| WO | WO 2007/146257 A2 | 12/2007 |
| WO | WO 2008/011101 A2 | 1/2008 |
| WO | WO 2008/073226 | 6/2008 |
| WO | WO 2008/157213 A2 | 12/2008 |
| WO | WO 2009/070179 A1 | 6/2009 |

OTHER PUBLICATIONS

Commonly-assigned, co-pending U.S. Patent Application (Serial No. not yet assigned) for "Methods, Systems and Computer Program Products for Accessing Number Portability (NP) and E.164 Number (ENUM) Data Using a Common NP/ENUM Data Locator Structure," (Unpublished, filed Nov. 29, 2006).

Commonly-assigned, co-pending U.S. Appl. No. 11/364,759 for "Methods, Systems, and Computer Program Products for Indexing, Validating, Recovering and Consolidating a Database Indexed by Range-Bound Numeric Data," (Unpublished, filed Feb. 28, 2006).

Commonly-assigned, co-pending U.S. Appl. No. 11/291,502 for "Methods, Systems, and Computer Program Products for Using an E.164 Number (ENUM) Database for Message Service Message Routing Resolution Among 2G and Subsequent Generation Network Systems," (Unpublished, filed Dec. 1, 2005).

Commonly-assigned, co-pending U.S. Appl. No. 11/132,402 for "Methods, Systems, and Computer Program Products for Providing Presence-Qualified E.164 Number Mapping (ENUM) Service in a Communications Network," (Unpublished, filed May 18, 2005).

Schwarz, "ENUM Trial to Link Phone, Internet Addresses," (Mar. 22, 2005).

Peterson, "Telephone Number Mapping (ENUM) Service Registration for Presence Services," Network Working Group (Jan. 2005).

Peterson et al., "Using E.164 Numbers With the Session Initiation Protocol (SIP)," Network Working Group, pp. 1-14 (Jun. 2004).

"Global Implementation of ENUM: A Tutorial Paper," International Telecommunication Union, Telecommunication Standardization Union, Study Group 2, (Feb. 8, 2002).

Mealling, "The Naming Authority Pointer (NAPTR) DNS Resource Record," Network Working Group (Sep. 2000).

Non-Final Official Action for U.S. Appl. No. 11/605,837, filed Feb. 1, 2011.

"Ericsson Unified Number Portability," (Downloaded from the Internet on Jan. 24, 2011).

Chinese Official Action for Chinese Patent Application No. 200680051295.9 (Dec. 24, 2010).

Notification of Transmittal of the International Search Report and the Written Opinion of the International Searching Authority, or the Declaration for International Application No. PCT/US2010/034372 (Nov. 30, 2010).

Notice of Allowance and Fee(s) Due for U.S. Appl. No. 11/291,502, filed Oct. 5, 2010.

Official Action for U.S. Appl. No. 11/888,907, filed Sep. 16, 2010.

Communication pursuant to Article 94(3) EPC for European application No. 07810606.9 (Aug. 26, 2010).

Official Action for U.S. Appl. No. 11/605,837, filed Jul. 20, 2010.

Communication Pursuant to Article 94(3) EPC for European Application No. 06844747.7 (May 11, 2010).

Notice of Allowance and Fee(s) Due for U.S. Appl. No. 11/879,737, filed Apr. 22, 2010.

Communication pursuant to Article 94(3) EPC for European application No. 07810606.9 (Feb. 12, 2010).

Final Official Action for U.S. Appl. No. 11/291,502, filed Feb. 4, 2010.

Supplementary European Search Report for European application No. 07810606.9 (Nov. 23, 2009).

Notification of Transmittal of the International Search Report and The Written Opinion of the International Searching Authority, or the Declaration for International application No. PCT/US2009/036538 (Sep. 30, 2009).

Non-Final Official Action for U.S. Appl. No. 11/879,737, filed Sep. 30, 2009.

"$3^{rd}$ Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 9)," 3GPP TS 29.272, V9.0.0, pp. 1-71 (Sep. 2009).

Communication pursuant to Article 94(3) EPC for European Application No. 06844747.3 (Jul. 28, 2009).

Final Official Action for U.S. Appl. No. 11/879,737, filed Jun. 9, 2009.

Official Action for U.S. Appl. No. 11/291,502, filed May 13, 2009.

Supplementary European Search Report for European Application No. 06844747.3 (Apr. 24, 2009).

Official Action for U.S. Appl. No. 11/364,759, filed Mar. 30, 2009.

Notification of Transmittal of the International Search Report and the Written Opinion of the International Searching Authority, or the Declaration for International Application No. PCT/US2008/066675 (Dec. 9, 2008).

Notification Concerning Transmittal of International Preliminary Report on Patentability for International Application No. PCT/US2006/046108 (Oct. 2, 2008.

Notification of Transmittal of the International Search Report and the Written Opinion of the International Searching Authority, or the Declaration for International Application No. PCT/US07/16370 (Sep. 15, 2008).

Official Action for U.S. Appl. No. 11/879,737, filed Sep. 15, 2008.

Notification of Transmittal of the International Search Report and the Written Opinion of the International Searching Authority, or the Declaration for International Application No. PCT/US2006/046108 (Sep. 9, 2008).

Communication of European publication number and information on the application of Article 67(3) EPC for Application No. 06844747.3 (Jul. 23, 2008).

Notification of Transmittal of the International Search Report and Writtent Opinion of the International Searching Authority, or the Declaration for International Application No. PCT/US07/13732 (Jan. 29, 2008).

Notice of Allowance for U.S. Appl. No. 10/729,519, filed Jul. 30, 2007.

"IP Multimedia Subsystem," printout from wikipedia.org, Wikimedia Foundation, Inc. (May 29, 2007).

Official Action for U.S. Appl. No. 10/729,519, filed Nov. 28, 2006.

"Hp OperCall Home Subscriber Server Software—Data Sheet", 4AA0-3360ENW Rev. 2, Hewlett-Packard Development Company, L.P. (Jul. 2006).

Lucent Technologies, "ENUM Use and Management for the Successful Deployment of ENUM-Enabled Services; Understand ENUM and its Deployment to Insure Success of your VoIP and Other ENUM-enabled Services," White Paper, pp. 1-12 (Jul. 2006).

Jones, "The Definitive Guide to Scaling Out SQL Server," http://www.snip.gob.ni/Xdc/SQL/DGSOSSFinal.pdf (Retrieved on Aug. 16, 2010) (2005).

3GPP, "3rd Generation Partnership Project; Technical Specification Group Core Network; Support of Mobile Number Portability (MNP); Technical Realization; Stage 2 (Release 6)," 3GPP TS 23.066, V6.0.0, pp. 1-83 (Dec. 2004).

"Cisco IP Transfer Point as the Signaling Gateway for the Cisco BTS 10200 Softswitch," Cisco Systems, Inc., pp. 1-10 (Summer 2004).

"Cisco IP Transfer Point as the Signaling Gateway for the Cisco PGW 2200 Softswitch," Cisco Systems, Inc., pp. 1-11 (Summer 2004).

"Next-Generation Signaling Transports Cisco IP Transfer Point," Cisco Systems, Inc., pp. 1-27 (Summer 2004).

"A Study in Mobile Messaging: The Evolution of Messaging in Mobile Networks, and How to Efficiently and Effectively Manage the Growing Messaging Traffic," White Paper, Cisco Systems, Inc., pp. 1-16 (Spring 2004).

Walker, "The IP Revolution in Mobile Messaging," Packet, Cisco Systems Users Magazine, vol. 16, No. 1, pp. Cover; 73-74; and 89 (First Quarter 2004).

"Cisco ITP Multilayer Routing (MLR) SMS MO Routing Requirements," Cisco Systems, Inc., p. 1 (Copyright 2004).

"Cisco Signaling Gateway Manager Release 3.2 for Cisco IP Transfer Point," Cisco Systems, Inc., pp. 1-9 (Copyright 1992-2004).

"Solutions for Mobile Network Operators," Cisco Systems, Inc., pp. 1-8 (Copyright 1992-2004).

Office Communication for U.S. Appl. No. 09/759,743, filed Oct. 20, 2003.

Cisco, "Quality of Service Networks," Internetworking Technologies Handbook, Chapter 49, pp. 49-1-49-32 (Sep. 11, 2003).

Moodie, "Agilent acceSS7: White Paper," Agilent Technologies, pp. 1-14 (Apr. 1, 2003).

Notice of Allowance and Fee(s) Due for U.S. Appl. No. 09/759,743, filed Mar. 10, 2003.

Interview Summary for U.S. Appl. No. 09/759,743, filed Feb. 27, 2003.

Foster et al., "Number Portability in the Global Switched Telephone Network (GSTN): An Overview," Network Working Group, RFC 3482 (Feb. 2003).

"Cisco IP Transfer Point," Cisco Systems, Inc., pp. 1-10 (Copyright 1992-2003).

"Cisco IP Transfer Point Multilayer Short Message Serivce Routing Solution," Cisco Systems, Inc., pp. 1-6 (Copyright 1992-2003).

"Cisco ITP MAP Gateway for Public WLAN Slm Authentication and Authorization," Cisco Systems, Inc., pp. 1-13 (Copyright 1992-2003).

Final Official Action for U.S. Appl. No. 09/759,743, filed Dec. 2, 2002.

Barry, "A Signal for Savings," Packet, Cisco Systems Users Magazine, vol. 14, No. 4, pp. Cover; 19-21; and 81 (Fourth Quarter 2002).

Interview Summary for U.S. Appl. No. 09/759,743, filed Sep. 13, 2002.

Official Action for U.S. Appl. No. 09/759,743, filed May 23, 2002.

Interview Summary for U.S. Appl. No. 09/759,743, filed Mar. 6, 2002.

"Agilent Tchnologies and Cisco Systems SS7 Over IP White Paper," Cisco Systems, Inc. and Agilent and Technologies, pp. 1-6 (Copyright 2002-Printed in the UK Feb. 1, 2002).

"Cisco IP Transfer Point: MTP3 User Adaptation (M3UA) and SCCP User Adaptation (SUA) Signaling Gateway," Cisco Systems, Inc., pp. 1-14 (Copyright 2002).

"Cisco SS7 Port Adapter for the Cisco 7500 Versatile Interface Processor and 7200 VXR Routers Provide High-Density SS7 Agrregation," Cisco Systems, Inc., pp. 1-5 (Copyright 1992-2002).

"Next-Generation SS7 Networks with the Cisco IP Transfer Point," Cisco Systems, Inc., pp. 1-14 (Copyright 1992-2002).

Official Action for U.S. Appl. No. 09/759,743, filed Dec. 3, 2001.

International Preliminary Examination Report for International Application No. PCT/US01/01052 (Nov. 7, 2001).

The attached email dated Oct. 20, 2001 and PowerPoint presentation dated Oct. 24, 2001 disclose an MSISDN-based auto-provisioning solution proposed by a customer of the assignee of the presend application.

"Agilent acceSS7 Business intelligence," Agilent Technologies, pp. 1-6 (Copyright 2001-Printed in the UK Nov. 30, 2001).

"Cisco IP Transfer Point (ITP) Network Management Product Presentation," Cisco Systems, Inc., pp. 1-20 (Copyright 2001).

"Networkers," Cisco Systems, Inc., pp. 1-60 (Copyright 2001).

"Cisco SS7 Signaling Offload," Cisco Systems, Inc., pp. 1-33 (Copyright 1992-2001).

Rockhold, "Or," Wireless Review, p. 22, 23, 26, 28, 30, 32, (Aug. 15, 2000).

"Topsail Beach-SS7 Over IP-" Cisco Systems, Inc., pp. 1-16 (Copyright 1999).

Smith, "Number Portability Pileup," Telephony, p. 22, 24, 26, (Jan. 6, 1997).

Jain et al., "Phone Number Portability for PCS Systems with ATM Backbones Using Distributed Dynamic Hashing," IEEE, vol. 15 (No. 1), p. 96-105, (Jan. 1997).

Heinmiller, "Generic Requirements for SCP Application and GTT Function for Number Portability," Illinois Number Portability Workshop, p. 1-50, (Sep. 4, 1996).

International Telecommunication Union, "Series Q: Switching and Signalling: Specifications of Signalling Systems No. 7-Signalling Connection Control Part," p. 11-16, (Jul. 1996).

Rice, "SS7 Networks in a PCS World," Telephony, pp. 138, 140 142, 144, 146, (Jun. 24, 1996).

Tekelec, "Eagle STP Planning Guide", Eagle Network Switching Division, (No. 3), p. i-vii, 1-64, A1-A2, B1-2, (May 1996).

Anonymous, "Generic Switching and Signaling Requirements for Number Portability," AT&T Network Systems, No. 1, p. 1-75, (Feb. 2, 1996).

ETSI, Digital Cellular Telecommunications System (Phase 2+); Milbe Application Part (MAP) Specification, Global System for Mobile Communications, pp. 112-114 (1996).

Jain, et al., "A Hashing Scheme for Phone Number Portability in PCS Systems with ATM Backbones," Bell Communications Research, p. 593-597, (1996).

Bishop, "Freeing the Network for Competition," Telecommunciations, p. 75-80, (Apr. 1995).

Anonymous, "Zeichengabesysteme-Eine neue Generation für ISDN und intelligente Netze," Zeichengabesystem, Medien-Institut Bremen, p. iz-xi; 170-176, (Feb. 17, 1995).

Giordano et al., "PCS Number Portability," IEEE, p. 1146-1150, (Sep. 1994).

Bellcore, "Signaling Transfer Point (STP) Generic Requirements," Bell Communications Research, No. 1, p. ii-xxii, 4-84-J14, (Jun. 1994).

Telcordia Technologies, "CCS Network Interface Specification (CCSNIS) Supporting SCCP and TCAP," Bell Communications Research, p. ii-xii, 1-1—C-22, (Mar. 1994).

Buckles, "Very High Capacity Signaling Trnsfer Point for Intelligent Network Services," DSC Communications Corporation, p. 1308-1311, (1988).

"Diameter Overview," referenced from www.ulticom.com/html/products/signalware-diameter-reference-guide.asp (Publication date unknown).

"Chapter 1: Overview," SS7 Port Adapter Installation and Configuration, pp. 1-1-1.8 (Publication Date Unknown).

"Configuring ITP Basic Functionally," IP Transfer Point, Cisco IOS Release 12.2(4)MB12, pp. 31-50 (Publication Date Unknown).

"Configuring ITP Optional Features," IP Transfer Point, Cisco IOS Release 12.294)MB12, pp. 65-136 (Publication Date Unknown).

"Configuring M3UA and SUA SS7 Over IP Signaling Gateways," IP Transfer Point, Cisco IOS Release 12.2(4)MB13, pp. 51-66 (Publication Date Unknown).

"Configuring M3UA and SUA SS7 Over IP Signaling Gateways," IP Transfer Point, Cisco IOS Release 12.2(4)MB10, pp. 49-62 (Publication Date Unknown).

Neustar, "ENUM: Driving Convergence in the Internet Age," pp. 1-5 (Publication Date Unknown).

Final Official Action for U.S. Appl. No. 12/400,576, filed Mar. 9, 2012.

Notice of Allowance and Fee(s) Due for U.S. Appl. No. 11/605,837, filed Jan. 20, 2012.

Non-Final Official Action for U.S. Appl. No. 12/400,576, filed Aug. 24, 2011.

Notice of Publication of Abstract for Indian Patent Application No. 6406/CHENP/2010 A (Jun. 17, 2011).

Interview Summary for U.S. Appl. No. 11/605,837, filed May 24, 2011.

Notice of Allowance and Fee(s) Due for U.S. Appl. No. 11/888,907, filed Apr. 1, 2011.

Chinese Official Action for Chinese Patent Application No. 200780030069.7 (Jan. 31, 2011).

Tsou et al., "Realm-Based Redirection In Diameter," draft-ietf-dime-realm-based-redirect-03, RFC 3588, pp. 1-6 (Jul. 12, 2010).

Korhonen et al., "Clarifications on the Routing of Diameter Requests Based on the Username and the Realm," RFC 5729, pp. 1-9 (Dec. 2009).

Communication of European publication number and information on the application of Article 67(3) EPC for European application No. 0786756637 (Aug. 12, 2009).

"3rd Generation Partnership Project; Technical Specification Group Services and System Aspects; Policy and charging control architecture (Release 8)," 3GPP TS 23.203, V8.1.1, pp. 1-87 (Mar. 2008).

* cited by examiner

```
;; HEADER SECTION
;; id = 41555
;; qr = 0   opcode = QUERY   aa = 0   tc = 0   rd = 0
;; ra = 0   ad = 0   cd = 0   rcode = NOERROR
;; qdcount = 1   ancount = 0   nscount = 0   arcount = 0

;; QUESTION SECTION (1 record)
;; 1.4.3.2.4.3.2.4.3.2.1.e164.arpa.    IN    NAPTR ;; ANSWER SECTION (0 records)

;; AUTHORITY SECTION (0 records)

;; ADDITIONAL SECTION (0 records)
```

FIG. 3

```
;; HEADER SECTION
;; id = 41555
;; qr = 1   opcode = QUERY   aa = 1   tc = 0   rd = 1
;; ra = 1   ad = 0   cd = 0   rcode = NOERROR
;; qdcount = 1  ancount = 2  nscount = 1  arcount = 1

;; QUESTION SECTION (1 record)
;; 1.4.3.2.4.3.2.4.3.2.1.e164.arpa.        IN      NAPTR ;; ANSWER SECTION (2 records)
1.4.3.2.4.3.2.4.3.2.1.e164.arpa.       0       IN      NAPTR     5688 39270 "U" "sip+E2U"
"!^.*$!SIP:+12342342341/PPMN@sip.mycarrier.com!" .
1.4.3.2.4.3.2.4.3.2.1.e164.arpa.       0       IN      NAPTR     5688 39994 "U" "sip+E2U"
"!^.*$!SIP:+12342342341/PPMN@sip2.mycarrier.com!" .

;; AUTHORITY SECTION (1 record)
;; 1.e164.arpa.    0     IN     NS     cary-c.

;; ADDITIONAL SECTION (1 records)
;; QoS = 7; QoS = 3
```

FIG. 5

METHODS, SYSTEMS, AND COMPUTER PROGRAM PRODUCTS FOR PROVIDING QUALITY OF SERVICE USING E.164 NUMBER MAPPING (ENUM) DATA IN A COMMUNICATIONS NETWORK

TECHNICAL FIELD

The subject matter described herein relates to providing Quality of Service (QoS) in a communications network. More particularly, the subject matter described herein relates to methods, systems, and computer program products for providing QoS using ENUM data in a communications network.

BACKGROUND

The Internet Engineering Task Force (IETF) initiated the development of the E.164 Number Mapping (ENUM) system for facilitating the interconnection of communications networks that rely on telephone numbers with the communications networks that utilize the Domain Name System (DNS). In particular, the ENUM system can map a particular number referred to as an E.164 number to one or more Uniform Resource Identifiers (URIs) in the DNS. URIs are strings of characters that identify resources such as documents, images, files, databases, e-mail addresses, websites or other resources or services in a common structured format. A URI can include a SIP URI, an instant messaging (IM) identifier, an e-mail address identifier, an Internet chat session identifier, or an IP address.

FIG. 1 is an exemplary communications network, generally designated 100, utilizing the ENUM system. Network 100 includes a signaling point (SP) 102 (e.g., a gateway, switching point, etc.) for connecting the Public Switched Telephone Network (PSTN) system 104 to an IP Multimedia Subsystem (IMS) 106. SP 102 is operable to enable communication between a conventional telephone unit or another suitable network device connected to PSTN 104 and a packet telephone unit or another suitable network device connected to IMS 106. The mobile telephone unit can communicate to IMS 106 via session initiation protocol (SIP) proxy server 108. The conventional telephone unit and packet telephone unit can communicate voice data, text data, or other suitable data. ENUM system can be utilized, for example, when a user of the standard telephone unit attempts to reach a subscriber associated with the packet telephone unit.

Communication between the conventional telephone unit and the packet telephone unit can be initiated when a user of the conventional telephone unit dials an E.164 formatted called party number (referred to herein as an E.164 number) for reaching a subscriber associated with the packet telephone unit. The dialed E.164 number (or called party number) is communicated from the conventional telephone unit to PSTN 104. PSTN 104 can then generate an ISUP IAM message 110 containing the E.164 number and send IAM message 110 to SP 102. In this example, SP 102 determines that the called subscriber phone is a packet phone and that an ENUM query is required. SP 102 formulates an EN UM query 112 and sends the query to EN UM database 114. In the ENUM query, the E.164 number is converted to ENUM message format by reversing the digit order of the dialed E.164 number and appending the highest level domain e164.arpa to the end. For example, if the original E.164 number is 123-456-7890, ENUM query 112 is converted 0.9.8.7.6.5.4.3.2.1.e164.arpa (also referred to herein as an E.164 number). ENUM server 114 uses the ENUM query to retrieve one or more naming authority pointer (NAPTR) records associated with the E.164 number. Each of the NAPTR records may identify at least one URI corresponding to the subscriber with the E.164 number. The URI may identify the mobile telephone unit. The URI is then communicated to SP 102 in an ENUM response 116 for establishing communication between the conventional telephone unit and the packet telephone unit.

In addition, more than one URI can be contained in the NAPTR records for identifying one or more other network devices, services and/or addresses. For example, another URI returned to SP 102 can identify a different way of reaching the subscriber associated with the dialed E.164 number, such as via e-mail or paging.

Rather than simply returning the URI or set of URIs obtained from ENUM server 114 to SP 102, it may be desirable to obtain additional information, such as the Quality of Service (QoS) information associated with each of the obtained URIs that may be used to contact the called party. Examples of QoS information may include the sound quality and the amount of throughput or bandwidth that is available to each URI. Current mechanisms for obtaining ENUM and QoS data are distinct. For example, ENUM data is obtained using ENUM queries and QoS data may be obtained or provided by a node, such as an end office switch or HLR serving a subscriber. In addition, QoS data is not linked to ENUM data. Rather, QoS data may be stored for conventional subscriber identifiers, such as subscriber directory numbers.

As described above, the mechanisms for obtaining ENUM and QoS data are separate and distinct. However, it may be desirable to combine QoS information with ENUM information in order to obtain enhanced contact information for a subscriber with multiple ENUM identities. Currently, such a combined mechanism does not exist.

Accordingly, in light of these difficulties associated with conventional ENUM systems, there exists a need for improved methods, systems, and computer program products for providing a combination of ENUM and QoS services in a communications network.

SUMMARY

According to one aspect, the subject matter described herein comprises methods, systems, and computer program products for providing QoS using E.164 number mapping (ENUM) data in a communications network. One method includes receiving a query message including an E.164 number. At least one uniform resource identifier (URI) associated with the E.164 number is located. QoS data corresponding to the at least one URI is obtained. Further, the query message can be responded to with the URI and the corresponding QoS data.

The subject matter described herein for providing QoS using ENUM data may be implemented using a computer program product comprising computer executable instructions embodied in a computer readable medium. Exemplary computer readable media suitable for implementing the subject matter described herein includes disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which:

FIG. 3 is a diagram of an exemplary ENUM query message according to an embodiment of the subject matter described herein;

FIG. 5 is a diagram of an exemplary ENUM response message according to an embodiment of the subject matter described herein;

DETAILED DESCRIPTION

Figure 1:
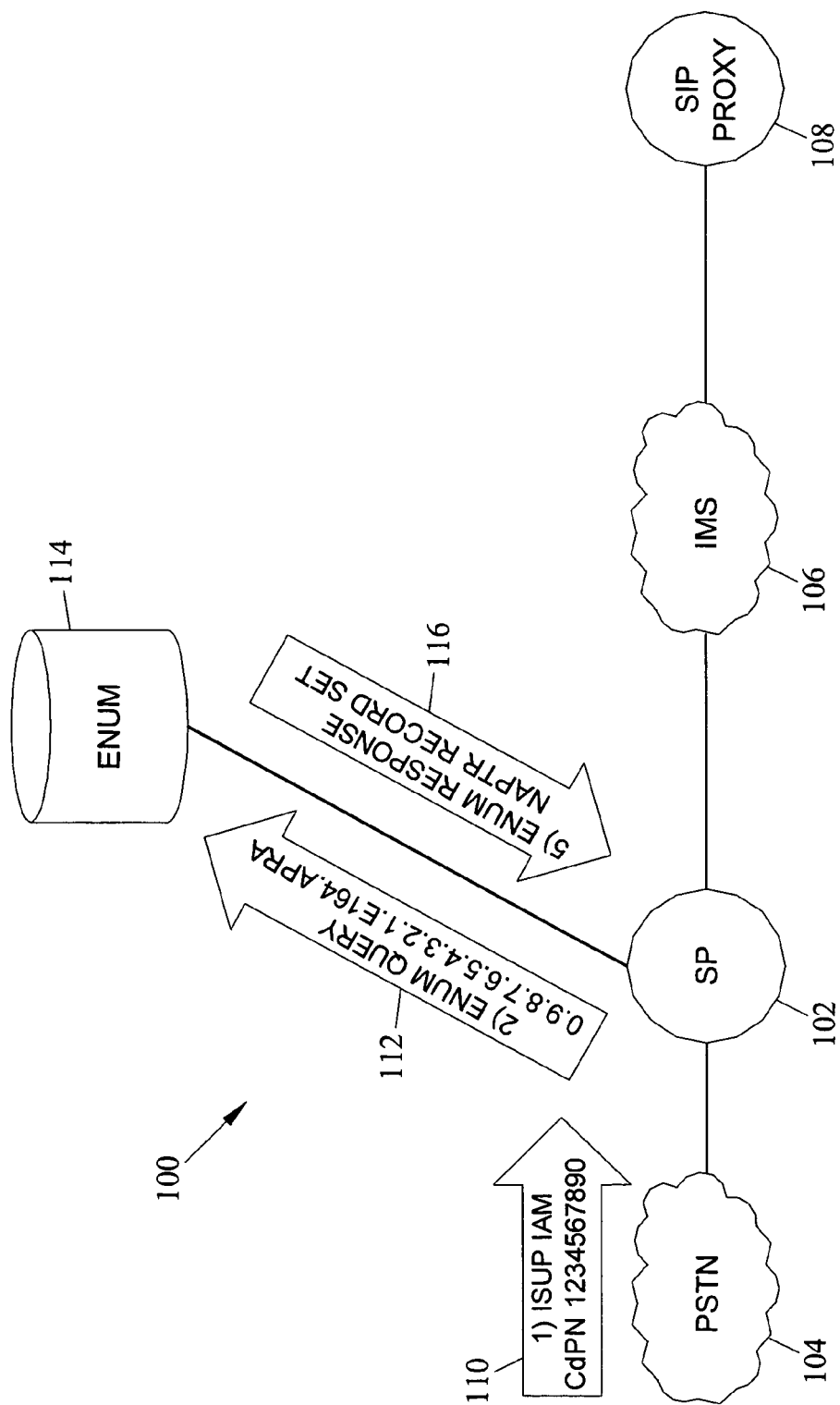
FIG. 1 is an exemplary communications network utilizing the ENUM system.
Figure 2:
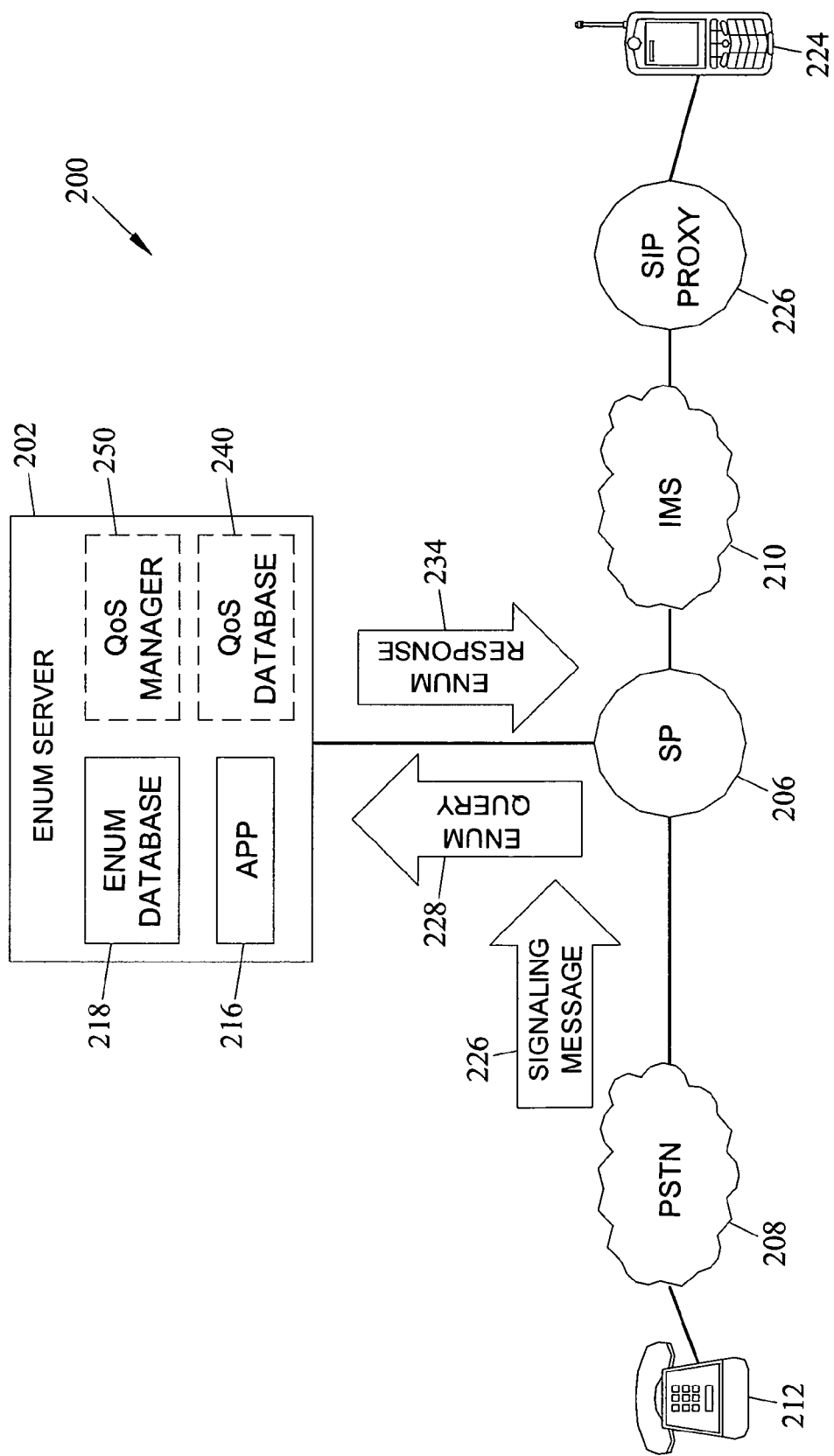
FIG. 2 is an exemplary system for providing QoS using ENUM data in a communications network according to an embodiment of the subject matter described herein.

FIG. 2 illustrates an exemplary network, generally designated 200, for providing QoS using ENUM data in a communications network according to an embodiment of the subject matter described herein. Referring to FIG. 2, network 200 can include an ENUM server 202 in operable communication with network 200. Network 200 can include an SP 206 for providing communication between a PSTN 208 and an IMS 210. Notably, the SP 206 may include, but is not limited to, a media gateway controller (MGC), softswitch (SS), mobile switching center (MSC), Tandem office (TO), End office (EO), and the like. Further, SP 206 can receive a call signaling message 226 for establishing communication between an end device in communication with PSTN 208 and IMS network 210. A call signaling message 226 may be an SS7 ISUP message (e.g., IAM), an SS7 TCAP message, an SS7 MAP message, a SIGTRAN signaling message (e.g., M3UA, SUA, etc.), a session initiation protocol (SIP) message, or other call signaling message. For example, SP 206 can receive signaling message 226 from PSTN 208 for establishing communication between a telephone unit 212 connected to PSTN 208 and a subscriber identified in the message, e.g., by an E.164 number. Alternatively, SP 206 can receive messages from any suitable source for establishing communication with a subscriber identified by an E.164 number.

SP 206 may determine whether an ENUM query is required based on whether the called party number corresponds to a subscriber of IMS network 210. If SP 206 determines that an ENUM query is required, SP 206 can transmit an ENUM query 228 to ENUM server 202. ENUM query 228 may contain an E.164 number. The E.164 number may be a called party telephone number. ENUM server 202 may also include an ENUM application 216 for performing a lookup in an ENUM database 218 for retrieving one or more URIs associated with the received E.164 number. For example, ENUM database 218 can maintain naming authority pointer (NAPTR) records associated with the URIs. The URIs are associated with the subscriber identified by the E.164 number. In one embodiment, the ENUM server 202 may also include a QoS database 240 where QoS information corresponding to each of the URIs may be stored.

In one exemplary scenario, SP 206 receives an ISUP IAM signaling message (i.e., signaling message 226) and formulates an ENUM query message 228 that is based on the received IAM message. In one embodiment, the CdPN (called party number) value of 234-234-2341 is included (in reverse dotted notation) in a "question" section of the ENUM query message as shown in FIG. 3, which depicts an exemplary query message. ENUM query message 228 is routed to ENUM server 202. ENUM server 202 is adapted to receive ENUM query message 228, extract the E.164 called party subscriber identifier, and perform a lookup in ENUM database 218 that contains ENUM translation information. A QoS manager 250 may perform a lookup in QoS database 240 using the ENUM translation information. For example, QoS manager 250 may query QoS database 240 to obtain QoS data for each URI returned in the ENUM database access.

In the example illustrated in FIG. 2, QoS data is stored on the same server or platform as the ENUM data. In an alternate embodiment, the QoS information may be stored on a QoS server separate from ENUM server 202 (not shown in FIG. 2). In yet another alternate embodiment, the ENUM and QoS data may be maintained in the same database such that both ENUM and corresponding QoS data can be obtained in a single access.

Table 1 below depicts an exemplary ENUM data structure, which may be found in database 218, that maps an E.164 subscriber identifier to one or more URI values and that associates a QoS value with each respective URI value.

TABLE 1

ENUM URIs and QoS Data

| E.164 Subscriber ID | URI | QoS |
| --- | --- | --- |
| 234 234 2341 | SIP URI A | Premium |
| 234 234 2341 | SIP URI B | Medium |
| 234 234 2341 | SIP URI C | Basic |

In table 1, each URI maps to a QoS value. In an alternate embodiment, the ENUM data structure may map an E.164 subscriber identifier to an ENUM Service Type (in lieu of a URI Type), and a QoS value may be associated with the ENUM service type. An example of this embodiment is presented in Table 2.

TABLE 2

ENUM Service Types and QoS Data

| E.164 Subscriber ID | URI/Service Type | QoS |
| --- | --- | --- |
| 234 234 2341 | SIP | Premium |
| 234 234 2341 | Mailto | Medium |

The sample data presented in Tables 1 and 2 includes an "abstract" QoS indicator value that is text-based (e.g., "Premium," "Medium," and "Basic"). In an alternate implementation, abstract QoS values may be numeric. For instance, a QoS indication system based on an arbitrary numeric range (e.g., 0-255, where 0 is interpreted as indicating the lowest QoS level and 255 is interpreted as indicating the highest QoS level) may be implemented. As defined herein, an abstract QoS indicator value is a QoS value that is not directly associated with a network-protocol-specific QoS mechanism, such as IP Precedence, Reservation Protocol (RSVP), multi-protocol label switching (MPLS), or other end-to-end QoS mechanisms. Regardless of the indication system used, it is the responsibility of the querying gateway that receives the abstract QoS indicator value to interpret the abstract value. For example, the gateway can associate the abstract QoS value (i.e., numeric, text-based, etc.) with a QoS level of service within a particular underlying network QoS mechanism (e.g., IP Precedence, RSVP, MPLS, etc.).

As opposed to being represented in an abstract manner, a QoS indicator value may instead be represented as a value that can be directly used within the context of a network-protocol-specific QoS mechanism. Specifically, the QoS indicator data associated with a given URI may be a protocol-specific QoS indicator. For example, a QoS indicator value may be a 3-bit value corresponding to the three most significant bits (MSB) of an IPv4 Type of Service (ToS) parameter. The 3-bit value may be used by a core network that employs IP precedence signaling as a means for implementing the core network QoS service. Depicted below in Table 3 is an example of ENUM QoS indicator data that is based on a three MSB IPv4 ToS. RFC 2475, which contains requirements for IPv6, increases the number of ToS bits to six bits. Thus, the present subject matter may support QoS indicators compatible with IPv6.

TABLE 3

E.164 Numbers and Corresponding Protocol-Specific QoS Data

| E.164 Subscriber ID | QoS |
|---|---|
| 234 234 2341 | 7 |
| 234 234 2342 | 4 |
| 234 234 2343 | 0 |

Figure 4:
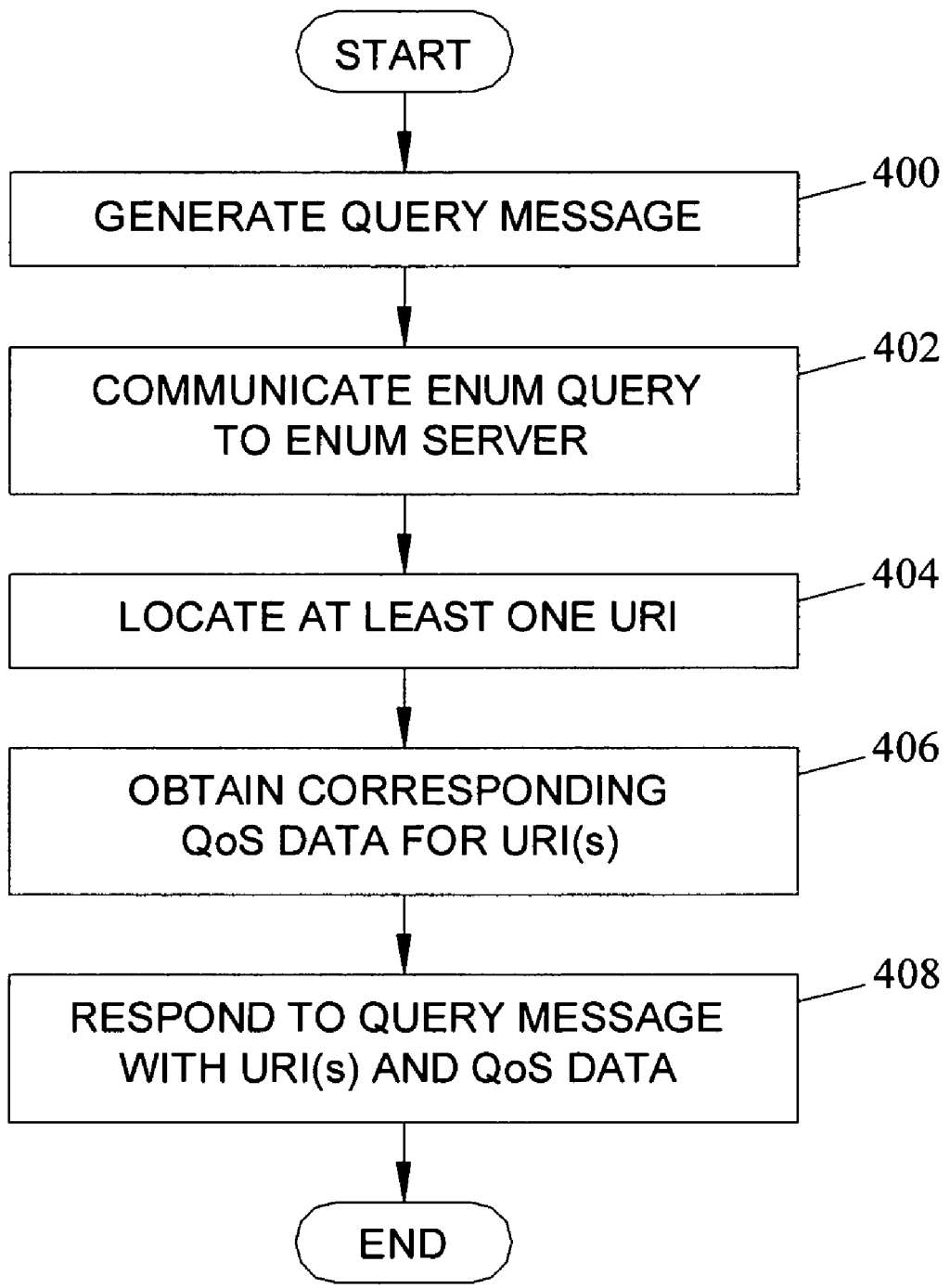
FIG. 4 is a flow chart illustrating exemplary steps for providing QoS service using ENUM data in a communications network according to an embodiment of the subject matter described herein.

FIG. 4 is a flow chart illustrating exemplary steps for providing a quality of service using ENUM data in communications network 200 according to an embodiment of the subject matter described herein. Referring to FIG. 4, in step 400, a network device, such as SP 206, can generate a query message after receiving a call signaling message. In one embodiment, the query message may include an E.164 number or called party number. Pursuant to IETF ENUM specifications, the network device can convert the E.164 number to an ENUM message format. For example, if the E.164 number or called party number is 123-456-7890, an ENUM query message may read 0.9.8.7.6.5.4.3.2.1.E164.arpa. In this conversion example, the digit order of the telephone number is reversed and the highest level domain E164.arpa is appended at the end.

At step 402, SP 206 can communicate ENUM query message 228 to ENUM server 202 as described above. In one embodiment, the ENUM query 228 may be implemented utilizing a signaling protocol, such as session initiation protocol (SIP).

At step 404, ENUM application 216 can utilize ENUM query message 228 for performing a lookup in ENUM database 218 to retrieve one or more URIs associated with the received E.164 called party number. Exemplary URIs associated with E.164 number 0.9.8.7.6.5.4.3.2.1.E164.arpa may include sip:john@companydesk.com and mailto:john@serviceprovider.com.

Next, at step 306, ENUM server 202 can obtain corresponding QoS data for the one or more URIs. In one embodiment, ENUM server 202 accesses local QoS database 240 using the previously obtained URIs. In another embodiment, the QoS data may instead be obtained from a separate QoS server. In response to receiving a query message from ENUM server 202, the QoS server may perform a lookup in a local database for retrieving QoS information for one or more of the URIs contained within the received query message. The QoS server may communicate to ENUM server 202 a QoS response message containing the retrieved QoS information for one or more of the URIs. Based on received message, ENUM application 216 can generate an ENUM response message 234 containing QoS information for one or more URIs associated with the E.164 number in the original ENUM message. For example, an ENUM response message may indicate that the URIs sip:john@companydesk.com and mailto:john@serviceprovider.com are associated with QoS levels of "Premium" and "Basic," respectively.

At step 408, ENUM server 202 can communicate an ENUM response message with the corresponding QoS data to SP 206. An exemplary ENUM response message is depicted in FIG. 5. In FIG. 5, the ENUM response includes an answer section with two URIs. The ENUM response also includes an additional section with two QoS values, one for each URI.

Figure 6:
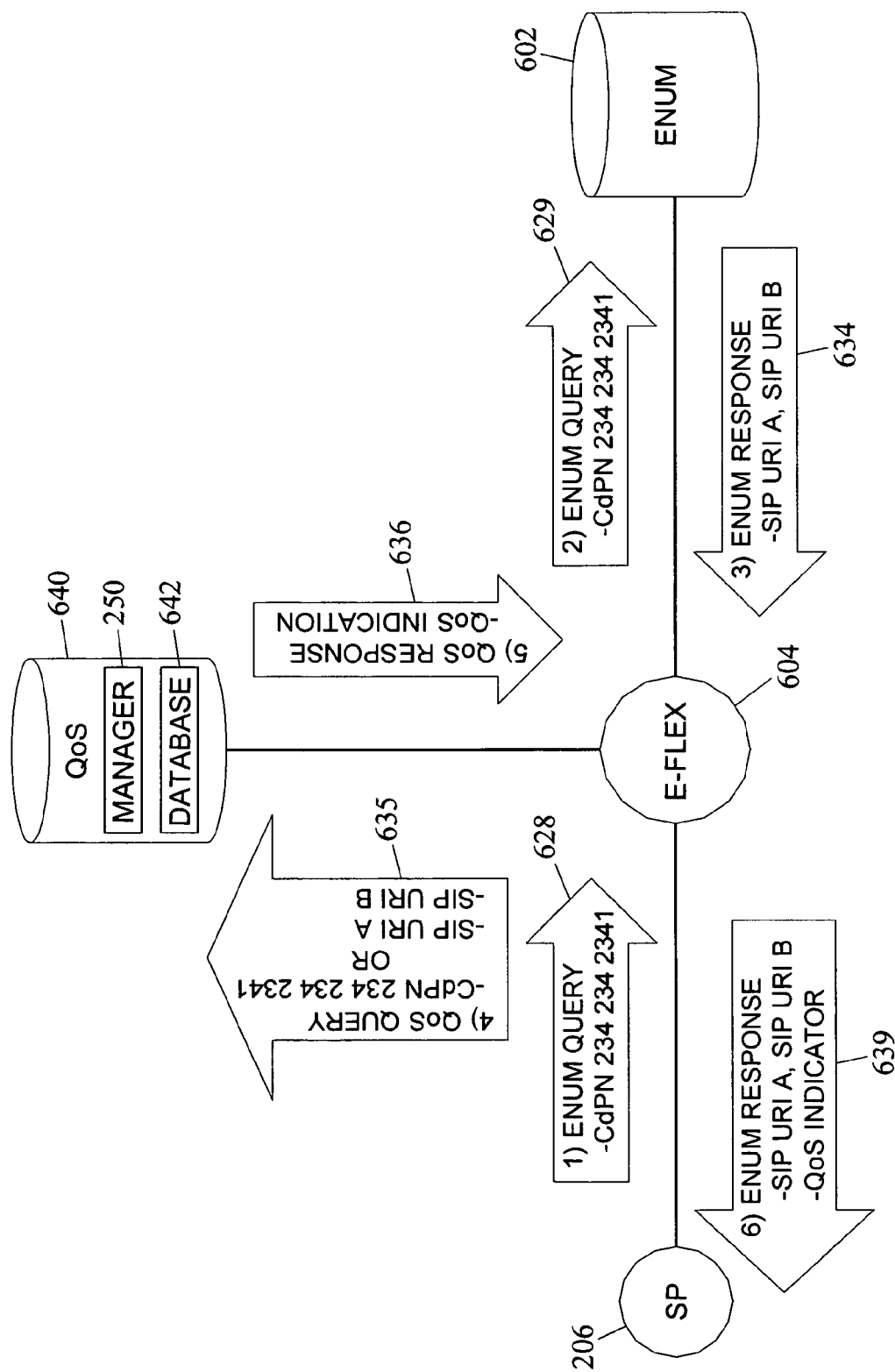
FIG. 6 is a network diagram illustrating an exemplary system including a QoS server operable to provide QoS data to an ENUM flexible numbering (E-Flex) node according to an embodiment of the subject matter described herein.

In FIG. 2, the ENUM and QoS applications and databases are located on the same network node. In another embodiment, a QoS server (or database application) may be implemented as a separate network node from the ENUM server and a third node, referred to herein as the E.164 flexible numbering (E-Flex) node, that may provide access to both databases. FIG. 6 illustrates such an embodiment. In the example shown in FIG. 6, SP 206 is adapted to generate an ENUM query message that contains a called party identifier, such as an E.164 number. The ENUM query is received (or intercepted) by an E-Flex function or node 604, which may be implemented as a hardware component or a software function. E-Flex node 604 is adapted to relay the ENUM query or a copy of the ENUM query (i.e., message 629) to ENUM server 602. The associated ENUM response 634 from ENUM server 602, which contains one or more URI values, is received or intercepted by E-Flex node 604. In one embodiment, E-Flex node 604 is not required to receive or intercept the ENUM query, but instead may simply receive or intercept the ENUM response 639.

E-Flex node 604 may be configured to buffer the ENUM response message 634 and to generate a QoS query message 635 that is routed to a QoS server 640. The QoS query message may contain the called party identifier (e.g., E.164 number) and/or a URI value(s) extracted from the buffered ENUM response message 634.

Figure 7:
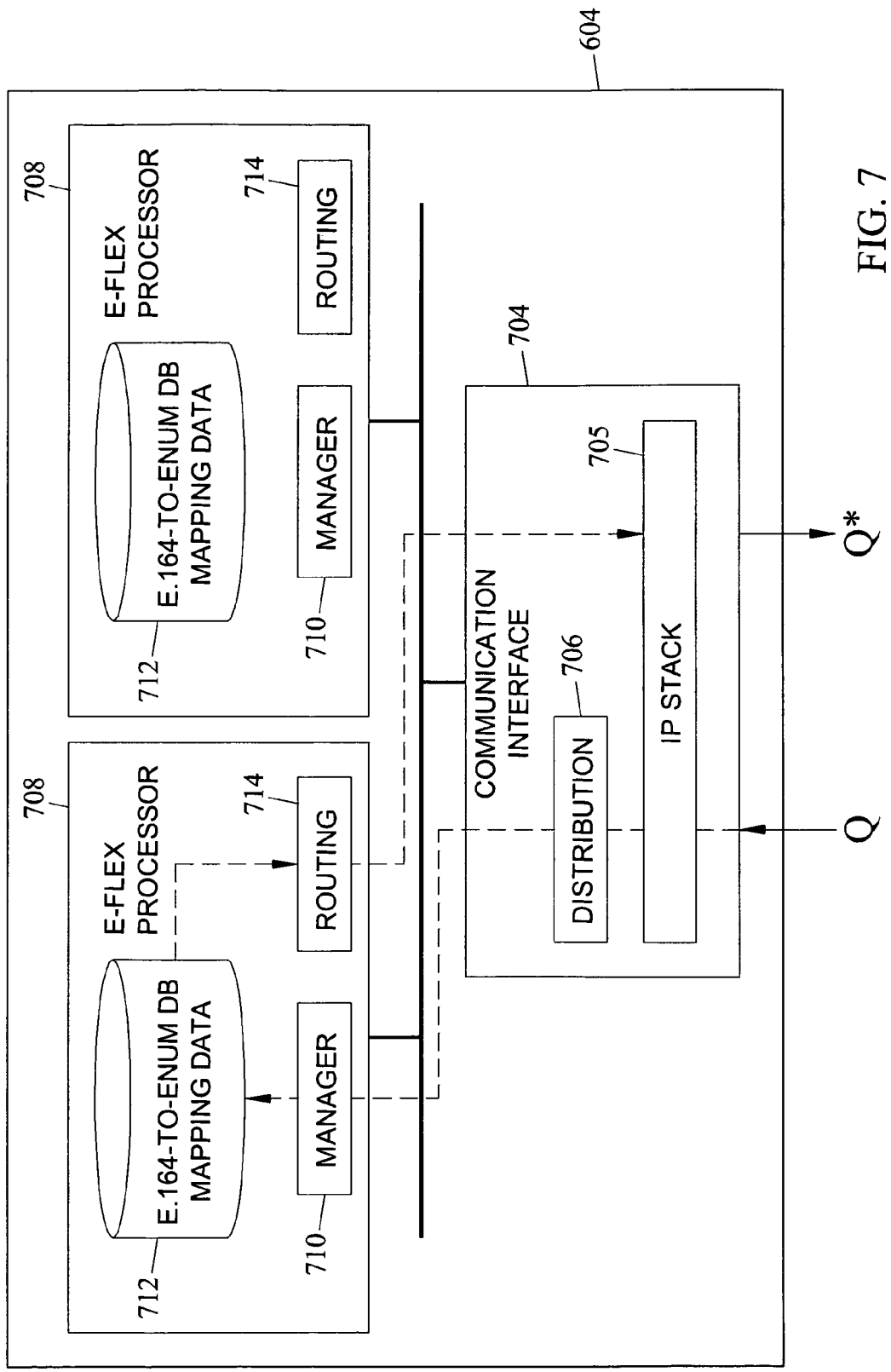
FIG. 7 is a block diagram illustrating an exemplary E-Flex node according to an embodiment of the subject matter described herein.

Presented in FIG. 7 is an exemplary E-Flex node 604, which is adapted to provide the aforementioned E-Flex functionality. E-Flex node 604 includes a communication interface 704 that is adapted to send and receive messages, such as ENUM query and response messages, via a communications network, such as an IP network or an SS7 network. In the illustrated example, communication interface 704 includes an IP stack 705 and a distribution function 706 that is adapted to distribute a received ENUM query message to an E-Flex processor module 708. Multiple E-Flex processor modules may be provisioned within an E-Flex node. An E-Flex processor module 708 includes a processing manager function 710, an E.164-to-ENUM address mapping data structure 712, and a routing function 714. E-Flex processor 708 is adapted to receive an ENUM query message from the distribution function 706. Processing manager function 710 is adapted to extract an E.164 subscriber identifier from the query message and use the extracted subscriber identifier to search the E.164-to-ENUM address mapping data structure 712 for a matching entry. If a matching entry is found, manager function 710 is adapted to modify the ENUM query message so as to address the ENUM query message to the ENUM database/server address returned from the matching entry. The modified ENUM query message is then passed to the routing function 714, which determines on which outbound communication link/socket/SCTP association/etc. the modified ENUM query message is to be transmitted. Routing function 714 then passes the modified message to the appropriate communication interface/module for transmission towards the "target" ENUM database/server.

E.164-to-ENUM address mapping data structure 712 may include exception and range-based components, and in which case the manager function 710 is adapted to search the exceptions data first, followed by the range-based or default data. For example, a first group of entries in databases 712 may be indexed by E.164 numbers that are exceptions to ranges of E.164 numbers by which a second group of entries are indexed. For example, the E.164-formatted number 9194605001 may correspond to a subscriber that has been ported out of a service provider's network. The service provider may own a block of E.164 formatted numbers ranging from 9194605000 to 9194605999. An entry may be provisioned in databases 712 for the ported out subscriber so that ENUM query messages for the subscriber are routed to the new service provider. The entry for 9194605001 represents an exception to the range 9194605000-9194605999 because it is indexed by a number within the range but may point to a different ENUM database or network.

In one implementation, E-Flex node 604 may be an SS7 signal transfer point (STP) with or without SS7/IP gateway functionality. An exemplary STP platform on which E-flex node 604 can be implemented is the Eagle® platform available from Tekelec of Morrisville, N.C.

Returning to FIG. 6, the called party identifier may be used to perform a lookup in a QoS database 642 at the QoS server 640 and return a subscriber-specific QoS value. In this scenario, the QoS database 642 may contain data similar to that previously shown in Table 3. In an alternate embodiment, the URI value(s) may be used to perform a lookup in a QoS database 642 at the QoS server 640 and return a URI-specific QoS value(s). In this instance, the QoS database 642 may contain data similar to that previously shown in Tables 1 and 2.

Upon receipt of a QoS response message 636, the E-Flex node 604 is adapted to extract QoS information from the QoS response message and incorporate at least some of the QoS information into the buffered ENUM response message. The modified ENUM response message 639 is then routed to originating SP 606. The QoS information may be incorporated in the additional section of the ENUM response, as illustrated in FIG. 5. In an alternate embodiment, QoS server 640 may return modified URI values that incorporate URI-specific QoS information. For example, the modified URI values may be Pete_High_QoS@tekelec.com.

Figure 8:
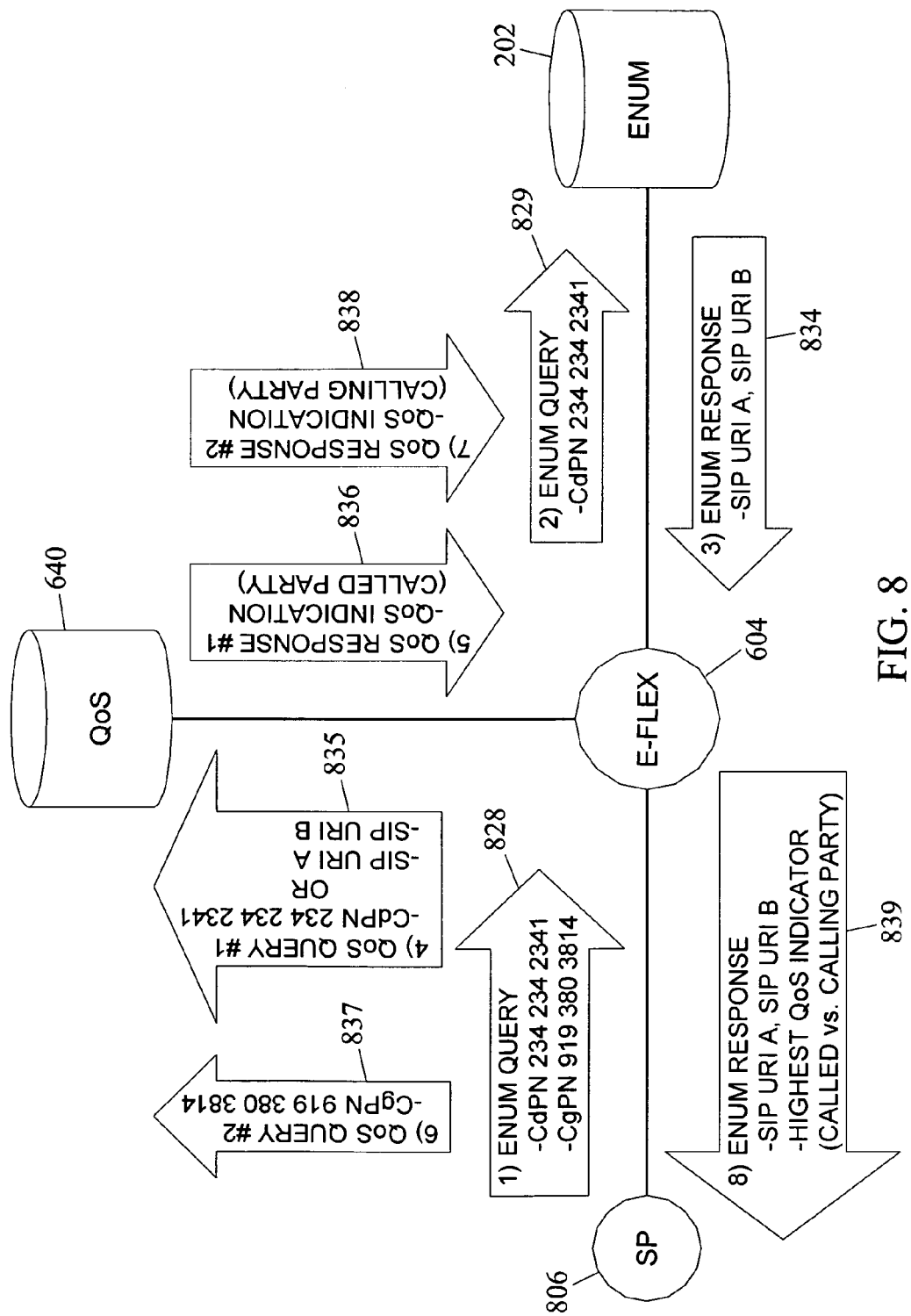
FIG. 8 is a network diagram illustrating an exemplary system including a QoS server operable to provide QoS data to an E-Flex node to compare QoS levels between called and calling parties according to an embodiment of the subject matter described herein.

In FIG. 6, QoS data is obtained using called party information. In an alternate embodiment, QoS information may be obtained using called and calling party information, and a rule may be applied to determine whether to apply the calling or called party QoS to a communication. FIG. 8 depicts such an embodiment. In FIG. 8, an E-Flex node 604 is adapted to receive (or intercept) an ENUM query and/or response. The E-Flex node 604 may also be configured to query QoS server 640 for QoS information associated with the called party identifier or URI identifier(s) from the ENUM query 828 or ENUM response 834. In this embodiment, the E-Flex node 604 is further adapted to query QoS server 640 for QoS information associated with the calling party (message 837 and message 838). Upon receiving QoS information from QoS server 640 for the called party/URI identifiers and for the calling party, E-Flex node 604 is adapted to modify the ENUM response message to include the highest QoS value among the called party/calling party QoS values returned by QoS server 640. In this manner, a call or communication session established between a called and calling party will receive a QoS service level corresponding to the highest QoS service level available among the called and calling parties. For example, a calling party who has contracted with a service provider for a 'Premium'-level QoS will receive 'Premium' QoS during a communication with a called party that has contracted with a service provider for a lesser QoS service level. More specifically, regardless of whether the QoS levels associated with the called party or the calling party involved in a particular communication, the highest QoS level will be utilized.

In the example illustrated in FIG. 8, QoS information for the called and calling parties is maintained in QoS database 640. In an alternate embodiment, ENUM server 602 (or associated database application) is instead adapted to store, access, and return QoS indicator information associated with the called party, while QoS server/database application 640 is adapted to store, access, and return QoS indicator information associated with the calling party. In a manner similar to that described above, E-Flex node 604 is adapted to examine QoS indicator values associated with both the called and calling parties, and to select the highest QoS indicator value thereby allowing the call/communication to be controlled by the highest QoS service level available between the called and calling parties. In an alternate embodiment, E-Flex node 604 may be adapted to select the lowest QoS indicator value. Consequently, the call is then handled by the lowest QoS service level associated with either the called or calling party.

Figure 9:
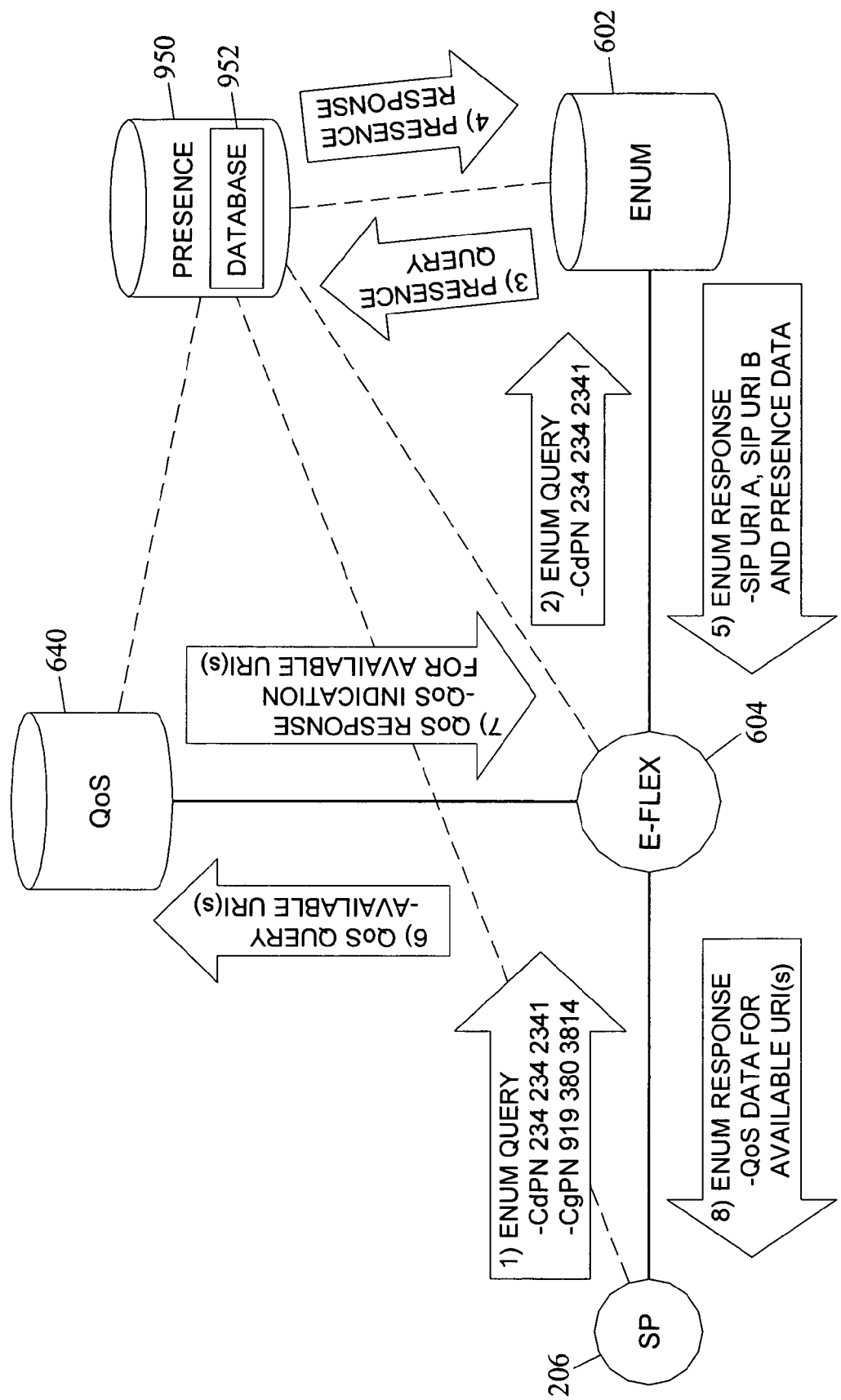
FIG. 9 is a network diagram illustrating an exemplary system including an E-Flex node receiving QoS data from a QoS server and presence data from a presence server according to an embodiment of the subject matter described herein.

According to one enhancement of the subject matter described herein, presence data may be returned with ENUM data and QoS information may be obtained for the presence-qualified ENUN data. FIG. 9 depicts an embodiment in which a presence server (which may be coupled to the QoS server, E-Flex function, ENUM server, the SP, and like network components) may be queried to determine the availability/preference status of a URI determined and/or returned by an ENUM database. In various embodiments, the presence query may be performed by the ENUM database, the QoS database, the E-Flex node, or the originating SP. The presence query may be used to identify available URIs such that QoS data is obtained for the available URIs. In one implementation, QoS queries may not be generated for available URIs.

For example, in one embodiment (as shown in FIG. 9) presence server 950 can maintain a database 952 containing presence status information for the URIs. In response to receiving the query message from ENUM server 602, presence server 204 can perform a lookup in database 952 to retrieve presence status information of each of the URIs. The retrieved presence status information for each URI can indicate the availability or unavailability associated with the URI. Presence server 950 transmits a response message containing the presence status information for one or more of the URIs (i.e., data indicating whether a URI is available or unavailable) to ENUM server 602. ENUM server then forwards the URI(s) and presence data to the E-Flex node 604. In an alternate embodiment, presence server 950 may return only the available URIs in the response message to ENUM server 602, which subsequently provides the received URIs to the E-Flex node 604. Based on the presence status information received, ENUM server 902 can obtain QoS information for the available URIs. Once obtained, the QoS information is transmitted to SP 206 via E-Flex node 604.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing a quality of service (QoS) using E.164 number mapping (ENUM) data in a communications network, the method comprising steps of:
    (a) receiving a query message including an E.164 number;
    (b) locating at least two uniform resource identifiers (URIs) associated with the E.164 number using an ENUM database;
    (c) obtaining corresponding QoS data for the at least two URIs; and
    (d) responding to the query message with a response message that includes both the at least two URIs and the corresponding QoS data.

2. The method according to claim 1 wherein receiving a query message includes receiving an ENUM query message.

3. The method according to claim 1 wherein the E.164 number comprises a called party number.

4. The method according to claim 1 wherein the E.164 number is associated with a subscriber.

5. The method according to claim 1 wherein the at least two URIs include at least one of a SIP URI, an instant messaging (IM) identifier, an e-mail address identifier, an Internet chat session identifier, and an IP address.

6. The method according to claim 1 wherein the locating the at least two URIs comprises searching a database of naming authority pointer (NAPTR) records containing the at least two URIs associated with the E.164 number.

7. The method according to claim 1 further comprising: acquiring corresponding presence information from a presence server for the at least two URIs.

8. The method according to claim 7 wherein obtaining the QoS data includes obtaining the QoS data for the URIs that have an available presence status.

9. The method according to claim 8 wherein responding to the query message comprises responding to the query message with the at least two URIs and indicating a presence status of each of the at least two URIs.

10. The method according to claim 1 wherein the query message includes a request for the corresponding QoS data.

11. The method according to claim 1 wherein the corresponding QoS data obtained for the at least two URIs comprises an abstract QoS indicator value.

12. The method according to claim 1 wherein the corresponding QoS data obtained for the at least two URIs comprises a protocol specific QoS indicator.

13. The method according to claim 1 wherein the corresponding QoS data is incorporated into the body of the at least two URIs.

14. The method according to claim 1 wherein the corresponding QoS data is incorporated in an additional section of an ENUM response.

15. The method according to claim 1 wherein obtaining the corresponding QoS data comprises obtaining the corresponding QoS data from the ENUM database.

16. The method according to claim 1 wherein obtaining the corresponding QoS data comprises obtaining the corresponding QoS data from the ENUM database.

17. The method according to claim 1 further comprising:
    (a) comparing a QoS level associated with a calling party and the corresponding QoS data to determine a highest available QoS level; and
    (b) providing service for a communication session between the calling party and a called party at the highest available QoS level.

18. The method according to claim 17 wherein the corresponding QoS data is obtained using a phone number of the calling party.

19. A system for providing quality of service (QoS) using E.164 number mapping (ENUM) data in a communications network, the system comprising:
    (a) an ENUM database for storing mappings between E.164-formatted numbers and uniform resource indicators (URIs); and
    (b) means for receiving a message containing an E.164-formatted number, for obtaining at least two URIs corresponding to the E.164-formatted number from the ENUM database, for obtaining QoS data corresponding to the E.164-formatted number and the at least two URIs, and for providing a second message containing both the QoS data and the at least two URIs.

20. The system according to claim 19 wherein the message comprises an ENUM query message.

21. The system according to claim 19 wherein the E.164-formatted number comprises a called party number.

22. The system according to claim 19 wherein the E.164-formatted number is associated with a subscriber.

23. The system according to claim 19 wherein the at least two URIs include at least one of a SIP URI, an instant messaging (IM) identifier, an e-mail address identifier, an Internet chat session identifier, and an IP address.

24. The system according to claim 19 wherein the means for receiving and for obtaining includes an ENUM application adapted to search the ENUM database for naming authority pointer (NAPTR) records containing the at least two URIs associated with the E.164-formatted number.

25. The system according to claim 24 wherein the ENUM application is adapted to acquire corresponding presence status data from a presence server for the at least two URIs.

26. The system according to claim 24 wherein the ENUM application is adapted to obtain the QoS data for URIs that have an available presence status.

27. The system according to claim 26 wherein the ENUM application is adapted to respond to the message with the at least two URIs and indicating a presence status of each of the at least two URIs.

28. The system according to claim 19 wherein the message includes a request for the corresponding QoS data.

29. The system according to claim 19 wherein the corresponding QoS data obtained for the at least two URIs comprises an abstract QoS indicator value.

30. The system according to claim 19 wherein the corresponding QoS data obtained for the at least two URIs comprises a protocol specific QoS indicator.

31. The system according to claim 19 wherein the corresponding QoS data is incorporated into the body of the at least two URIs.

32. The system according to claim 19 wherein the corresponding QoS data is incorporated in an additional section of an ENUM response.

33. The system according to claim 19 wherein the means for receiving and for obtaining includes querying a QoS database separate from the ENUM database.

34. The system according to claim 19 wherein the means for receiving and for obtaining includes means for obtaining the corresponding QoS data from the ENUM database.

35. The system according to claim 24 wherein the ENUM application is further adapted to compare a QoS level associated with a calling party and the corresponding QoS data to determine a highest available QoS level, and to provide service for a communication session between the calling party and a called party at the highest available QoS level.

36. The system according to claim 35 wherein the corresponding QoS data associated with a calling party is obtained using a phone number of the calling party.

37. A non-transitory computer readable medium having stored thereon computer executable instructions that when executed by a processor of a computer perform steps comprising:
(a) receiving a query message including an E.164 number;
(b) locating at least two uniform resource identifiers (URIs) associated with the E.164 number using an E.164 number mapping (ENUM) database;
(c) obtaining corresponding QoS data for the at least two URIs; and
(d) responding to the query message with a response message that includes both the at least two URIs and the corresponding QoS data.

38. An E.164 flexible numbering (E-Flex) node, comprising:
(a) a communication interface for receiving an E.164 number mapping (ENUM) response message originating from an ENUM server and containing at least two uniform resource identifiers (URIs); and
(b) an E-Flex processor for receiving the ENUM response message from the communication interface, for buffering the ENUM response message, for obtaining QoS data for the at least two URIs, and for communicating the ENUM response message that includes both the QoS data and the at least two URIs to a requesting node.

39. A non-transitory computer-readable medium having stored thereon an E.164 number mapping (ENUM) database, the database comprising:
(a) a plurality of first data fields containing directory numbers of subscribers of an E.164 number mapping service;
(b) a plurality of second data fields respectively corresponding to the first data fields containing at least two uniform resource identifiers (URIs) for each of the directory numbers; and
(c) a plurality of third data fields respectively corresponding to the second data fields containing quality of service (QoS) data for each of the at least two URIs.

* * * * *